(12) United States Patent
Kim et al.

(10) Patent No.: US 11,548,424 B2
(45) Date of Patent: Jan. 10, 2023

(54) POWER LEG REST FOR VEHICLE

(71) Applicants: Hyundai Motor Company, Seoul (KR); Kia Motors Corporation, Seoul (KR); DAS CO., LTD, Gyeongju-si (KR)

(72) Inventors: Tae Su Kim, Gunpo-si (KR); Soo Hyun Moon, Hwaseong-si (KR); Hyun Kyu Moon, Hwaseong-si (KR); Sang Hwi Yoon, Incheon (KR); Du Go Jung, Hwaseong-si (KR); Hyun Ko, Suwon-si (KR); Won Jin Choi, Yongin-si (KR); Young Joon Kim, Suwon-si (KR)

(73) Assignees: Hyundai Motor Company, Seoul (KR); Kia Motors Corporation, Seoul (KR); DAS CO., LTD, Gyeongju-si (KR)

( * ) Notice: Subject to any disclaimer, the term of this patent is extended or adjusted under 35 U.S.C. 154(b) by 146 days.

(21) Appl. No.: 17/144,470

(22) Filed: Jan. 8, 2021

(65) Prior Publication Data
US 2022/0048422 A1    Feb. 17, 2022

(30) Foreign Application Priority Data
Aug. 12, 2020 (KR) .................. 10-2020-0101015

(51) Int. Cl.
*B60N 2/90* (2018.01)

(52) U.S. Cl.
CPC .................. *B60N 2/995* (2018.02)

(58) Field of Classification Search
CPC .................. A47C 1/0342; B60N 2/995
See application file for complete search history.

(56) References Cited

U.S. PATENT DOCUMENTS

| | | | | |
|---|---|---|---|---|
| 6,095,610 A * | 8/2000 | Okajima | ................ | B60N 2/995 297/423.26 |
| 7,229,134 B2 * | 6/2007 | Ito | ................ | B60N 2/233 297/69 |
| 8,870,289 B2 * | 10/2014 | Yin | ................ | A47C 7/5068 297/423.22 |
| 9,113,712 B2 * | 8/2015 | Wittenberg, Jr. | ................ | A47C 1/035 |

(Continued)

FOREIGN PATENT DOCUMENTS

| | | |
|---|---|---|
| JP | 4645315 B2 | 3/2011 |
| KR | 10-2013-0073221 A | 7/2013 |
| KR | 10-1881272 B1 | 7/2018 |

*Primary Examiner* — Philip F Gabler
(74) *Attorney, Agent, or Firm* — Morgan, Lewis & Bockius LLP (57) ABSTRACT

A power leg rest for a vehicle includes a pair of fixed plates; a main pipe connected to between internal surfaces of the fixed plates; a tilt motor tiltably mounted to the main pipe; a pair of main links fastened to external surfaces of the fixed plates by respective first hinge pins; a support pipe connected to between front end portions of the main links; a lead nut bracket coupled to a lead screw and movable forwards and backwards and hingedly fastened to the support pipe; a pair of leg rest links mounted on both sides of a leg rest frame; and a pair of driving links, each being hingedly fastened to corresponding ones of the leg rest links, the main links, and the fixed plates, operating in linkage with the main link, and folding or unfolding the pair of leg rest links.

19 Claims, 7 Drawing Sheets

- UNFOLDED TO MAXIMUM ANGLE -

(56) References Cited

U.S. PATENT DOCUMENTS

| | | | | |
|---|---|---|---|---|
| 9,700,140 B2* | 7/2017 | Lawson | ............... | A47C 1/0345 |
| 9,963,055 B2* | 5/2018 | Seo | ..................... | B60N 2/0232 |
| 9,994,139 B2* | 6/2018 | An | ....................... | B60N 2/0232 |
| 10,507,742 B2* | 12/2019 | Bowen | ................. | B60N 2/2252 |
| 11,065,996 B2* | 7/2021 | Ito | .......................... | B60N 2/995 |
| 2012/0091779 A1* | 4/2012 | Chang | ................... | B60N 2/995 |
| | | | | 297/423.3 |
| 2013/0062914 A1* | 3/2013 | Marshall | ............... | A47C 7/506 |
| | | | | 297/69 |
| 2020/0223342 A1* | 7/2020 | Ito | .......................... | B60N 2/995 |
| 2022/0048422 A1* | 2/2022 | Kim | ..................... | B60N 3/063 |

\* cited by examiner

- UNFOLDED TO 20° -

FIG. 6

- UNFOLDED TO 40° -

FIG. 7

- UNFOLDED TO MAXIMUM ANGLE -

POWER LEG REST FOR VEHICLE

CROSS REFERENCE TO RELATED APPLICATION

The present application claims priority to Korean Patent Application No. 10-2020-0101015, filed on Aug. 12, 2020, the entire contents of which is incorporated herein for all purposes by this reference.

BACKGROUND OF THE INVENTION

Field of the Invention

The present invention relates to a power leg rest for a vehicle, and more particularly, to a power leg rest for a vehicle capable of operating stably with a reduced number of components.

Description of Related Art

In general, a vehicle seat includes a seat cushion on which an occupant may be accommodated, a seat back on which the occupant leans his or her back, and a headrest for supporting the neck or head of the occupant, and also various comfort devices may be mounted to the vehicle seat.

Among the comfort devices, an electric leg rest is foldably mounted to a front portion of the seat cushion.

However, for the folding and unfolding operation, the conventional leg rest includes a motor and a recliner which is operated by the motor and has a complex structure comprised of a large number of mounted parts, which in turn causes high manufacturing cost thereof and increases the weight thereof.

Furthermore, due to the large number of mounted portions and the increased weight, the durability of the leg rest may deteriorate, or a failure which prevents the leg rest from being properly folded or unfolded may occur frequently.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power leg rest for a vehicle which enables stable folding and unfolding operations, and effective reduction of the number of components and weight thereof, by employing a tilt motor and a lead nut bracket mounted movably forwards and backwards on a lead screw as an output shaft of the tilt motor.

according In various aspects of the present invention, there is provided a power leg rest for vehicle including: a pair of fixed plates configured to be connected to a seat cushion frame; a main pipe connecting internal surfaces of the fixing plates; a tilt motor tiltably mounted to the main pipe; a pair of main links, each being hingedly fastened to an external surface of an corresponding one of the fixed plates by a first hinge pin at a rear end portion thereof; a support pipe connected to between front end portions of the main links; a lead nut bracket coupled to a lead screw and movable forwards and backwards, wherein the lead screw is an output shaft of the tilt motor, and hingedly fastened to the support pipe; a pair of leg rest links mounted on both sides of a leg rest frame; and a pair of driving links, each being hingedly fastened to an corresponding one of the leg rest links, an corresponding one of the main links and an corresponding one of the fixed plates, operating in linkage with the main link, and folding or unfolding the pair of leg rest links.

Preferably, each of the driving links may include: a support link hingedly fastened to a lower end portion of the fixed plate by a second hinge pin; a rear link hingedly fastened to a front end portion of the support link by a third hinge pin at a lower end portion thereof, hingedly fastened to a middle portion of the main link by a fourth hinge pin at a middle portion thereof, and hingedly fastened to a rear end portion of the leg rest link by a fifth hinge pin at an upper end portion thereof; and a front link hingedly fastened to a front end portion of the main link by a sixth hinge pin at a lower end portion thereof, and hingedly fastened to a middle portion of the leg rest link by a seventh hinge pin at an upper end portion thereof.

Preferably, each of the pair of fixed plates may include: a first fixed plate having an internal surface to which one end portion of the main pipe is fixed, and an external surface to which the rear end portion of the main link is hingedly fastened by the first hinge pin; and a second fixed plate being in contact with and attached to the external surface of the first fixed plate, and hingedly fastened to the rear end portion of the support link by the second hinge pin at the lower end portion thereof.

Preferably, each of the first and second fixed plates may be provided with a mounting end portion formed at an upper end portion thereof, wherein the mounting end portion may have a mounting hole configured for being coupled to the seat cushion frame.

A motor mounting bracket to which the tilt motor is tiltably fastened may be fixedly mounted to the main pipe.

The motor mounting bracket may be provided with a first hinge hole formed in a lower portion thereof, and the tilt motor may have a first hinge end portion hingedly fastened to the first hinge hole by a first tilting pin.

The lead nut bracket may include a lead nut portion engaged to the lead screw and movable forwards and backwards of the lead screw according to a rotation of the lead screw, and a bracket portion hingedly fastened to the support pipe, wherein the lead nut portion and the bracket portion are integrally formed into a single piece.

The bracket portion may be provided with a second hinge hole formed at a front end portion thereof, and the support pipe may be provided with a second hinge end portion hingedly fastened to the second hinge hole by a second tilting pin.

The present invention may achieve advantageous effects as described below by providing above-mentioned embodiments for eliminating drawbacks.

First, the folding and unfolding operations of the leg rest may be performed stably by employing the tilt motor and the lead nut bracket mounted movably forwards and backwards on a lead screw as an output shaft of the tilt motor.

Second, by excluding the motor and the complex recliner for reclining a leg rest of the conventional leg rest, and by employing the tilt motor and the lead nut bracket, it is possible to achieve the effective reduction of the number of components and weight, which in turn can improve the durability of the leg rest.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described in detail with reference to the accompanying drawings. Throughout the drawings, the same reference numerals will refer to the same or like parts.

Figure 1:
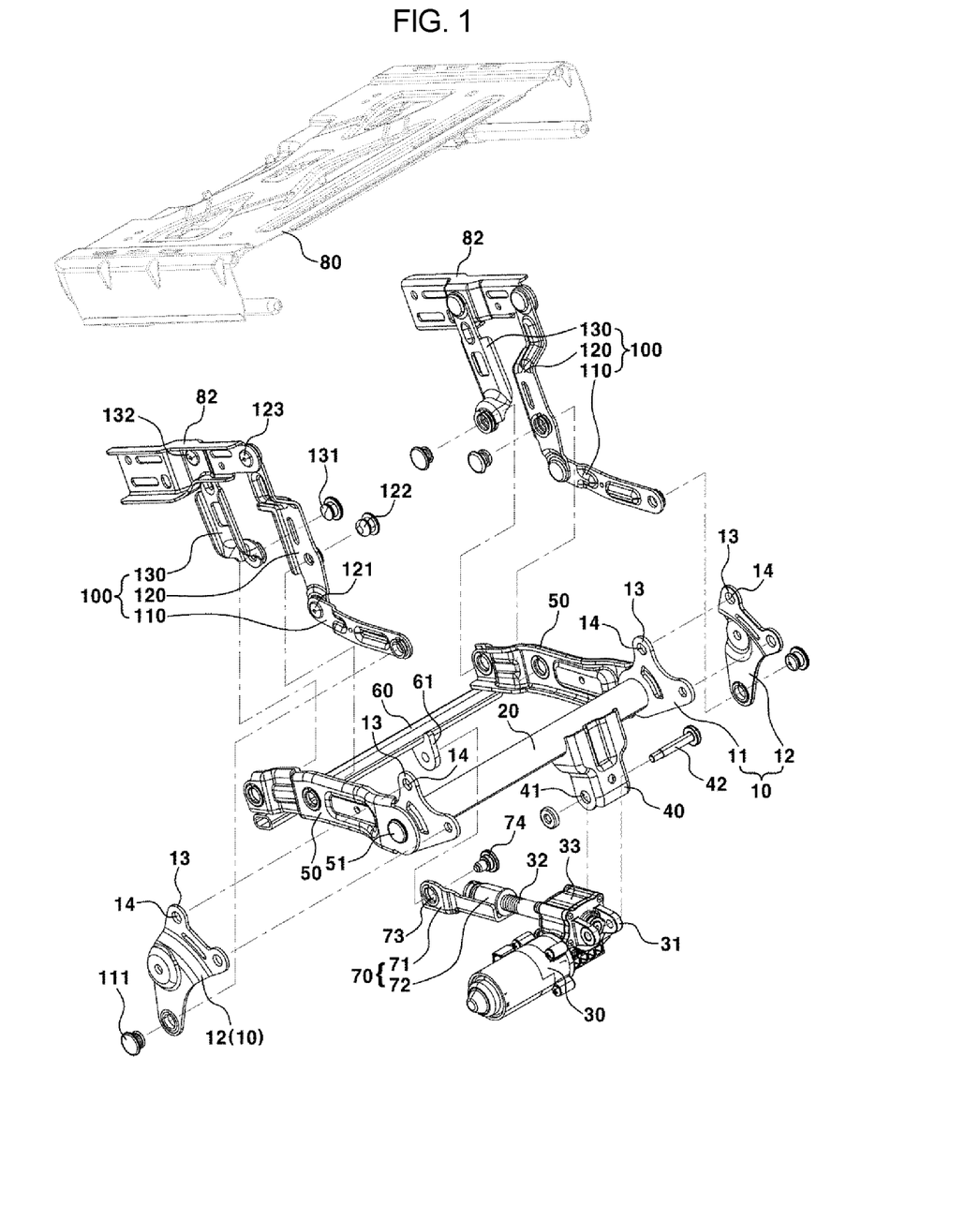
FIG. 1 is an exploded perspective view exemplarily illustrating a power leg rest for a vehicle according to various exemplary embodiments of the present invention.
Figure 2:
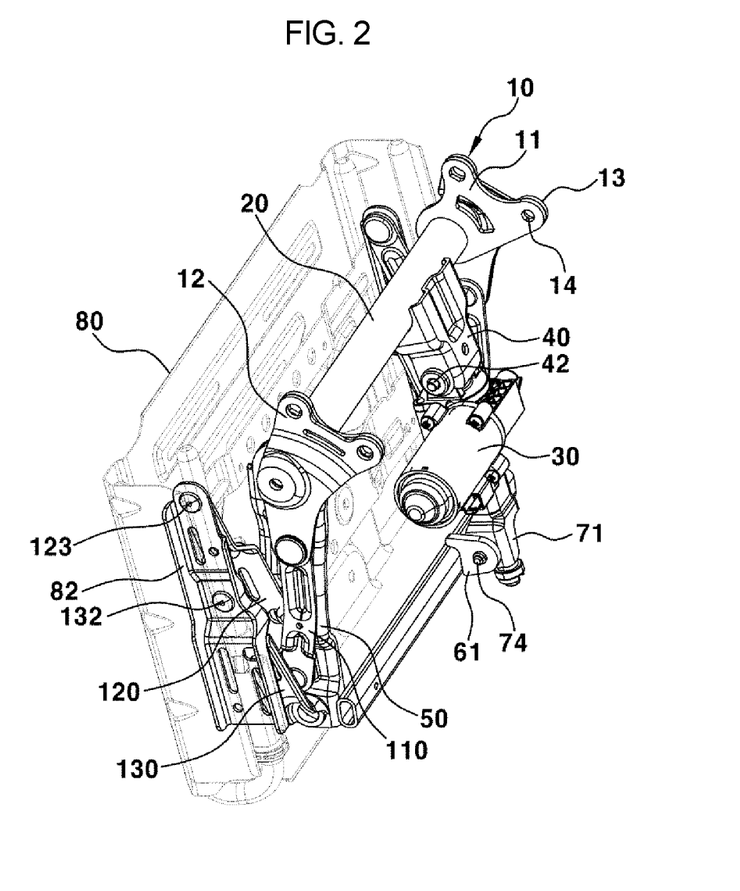
FIG. 2 is a perspective view exemplarily illustrating a folding state of a power leg rest for a vehicle according to various exemplary embodiments of the present invention.
Figure 3:
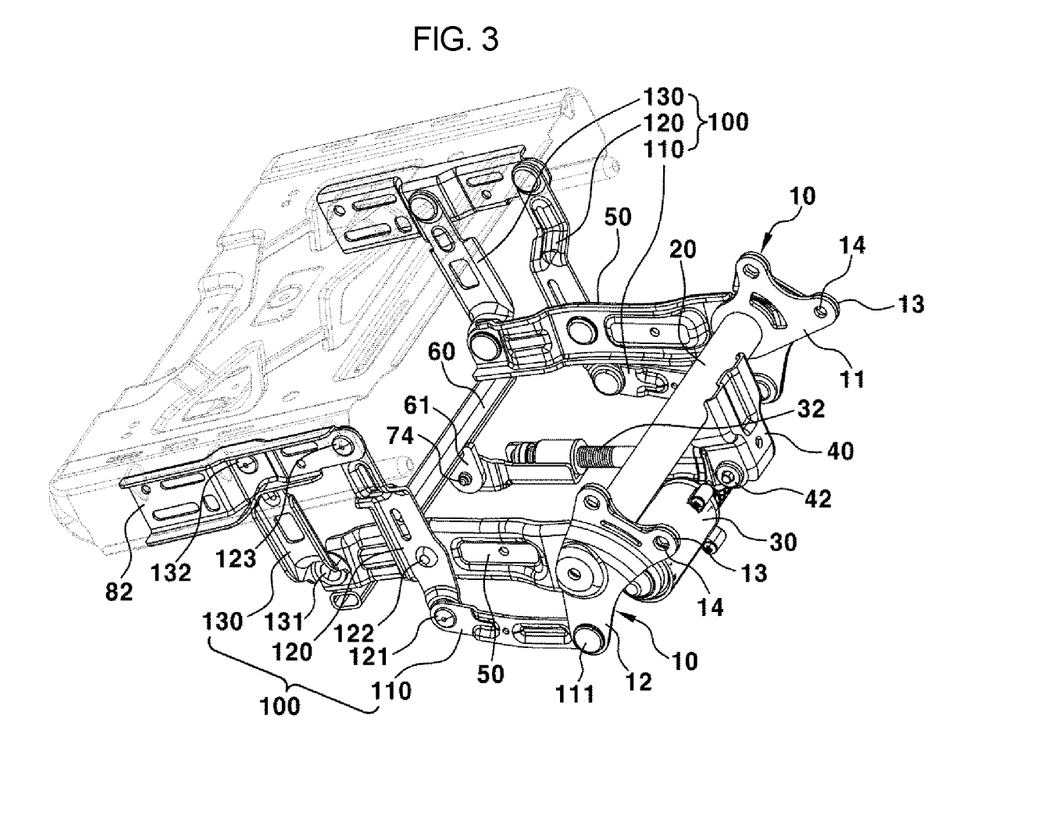
FIG. 3 is a perspective view exemplarily illustrating an unfolding state of a power leg rest for a vehicle according to various exemplary embodiments of the present invention.

Accompanying FIG. 1 is an exploded perspective view exemplarily illustrating a power leg rest for a vehicle according to various exemplary embodiments of the present invention, FIG. 2 and FIG. 3 are perspective views illustrating a mounted state of a power leg rest for a vehicle according to various exemplary embodiments of the present invention, and in every drawing, reference number 10 designates a pair of fixed plates fixedly mounted to a seat cushion frame.

A main pipe 20 may be connected to between internal surfaces of the fixed plates 10.

That is, both end portions of the main pipe 20 may be each integrally fixed to one of the internal surfaces of the fixed plates 10 by, for example, welding or the like.

Preferably, each pair of the fixed plates 10 may include a first fixed plate 11 to which one of both the end portions of the main pipe 20 is fixed, and a second fixed plate 12 which is in closely contact with an external surface of the first fixed plate 11 and is configured to be attached to the seat cushion frame along with the first fixed plate 11.

To the present end, a mounting end portion 13 having a mounting hole 14 for mounting to the seat cushion frame may be protrudingly formed at an upper end portion of each of the first and second fixed plates 11 and 12.

A tilt motor 30 may be tiltably mounted to the main pipe 20.

An output shaft of the tilt motor 30 may be a lead screw 32 which is rotated in place, and as various exemplary embodiments of the present invention, an output shaft of a gear box 33 of the tilt motor 30 may be employed as the lead screw 32.

To tiltably mount the present tilt motor 30 to the main pipe 20, a motor mounting bracket 40 to which the tilt motor 30 is tiltably fastened may be fixedly mounted to the main pipe 20 via welding or like.

In this regard, a first hinge hole 41 may be formed in the lower portion of the motor mounting bracket 40, and the tilt motor 30 may have a first hinge end portion 31 hingedly fastened to the first hinge hole 41 by a first tilting pin 42.

Thus, by bringing the first hinge end portion 31 into close contact with the first hinge hole 41 and then fastening them to each other with the first tilting pin 42, the tilt motor 30 may be tiltably rotated with respect to the motor mounting bracket 40.

Onto the external surface of the first fixed plate 11 of each fixed plate 10, a rear end portion of a main link 50 may be hingedly fastened by a first hinge pin 51, while to a lower end portion of the second fixed plate 12, a rear end portion of a support link 110 included in a driving link 100 may be hingedly fastened by a second hinge pin 111.

Furthermore, a support pipe 60 may be integrally connected to between front end portions of the main links 50 by, for example, welding or the like.

To the support pipe 60, a lead nut bracket 70 which is fastened movably forwards and backwards to the lead screw 32 which is the output shaft of the tilt motor 30 may be hingedly fastened.

The lead nut bracket 70 may include a lead nut portion 72 which is fastened movably forwards and backwards to the lead screw 32, and a bracket portion 71 which is hingedly fastened to the support pipe 60, and a second hinge hole 73 may be formed at the front end portion of the bracket portion 71, and a second hinge end portion 61 which is hingedly fastened to the second hinge hole 73 by a second tilting pin 74 may be formed in the support pipe 60.

Accordingly, when the lead screw 32 is rotated in place by rotation drive of the tilt motor 30, the lead nut bracket 70 may be moved forward, pushing the support pipe 60, or be moved backward, pulling the support pipe 60.

Meanwhile, leg rest links 82 may be respectively mounted on both sides of a leg rest frame 80 forming a framework of a leg rest portion.

Furthermore, each of a pair of driving links 100 for folding or unfolding the leg rest frame 80 including the leg rest link 82 may be hingedly fastened to the leg rest link 82, the main link 50, and the second fixed plate 12 in a predetermined arrangement.

Accordingly, the pair of driving links 100 is configured to fold or unfold the leg rest links 82 when the main links 50 are rotated according to the drive of the tilt motor 30.

To the present end, each driving link 100 may include the support link 110 hingedly fastened to the second fixed plate 12, a rear link 120 hingedly fastened to the support link 110, the main link 50 and the leg rest link 82, and a front link 130 hingedly fastened to the main link 50 and the leg rest link 82.

In this regard, the rear end portion of the support link 110 may be hingedly fastened to the lower end portion of the second fixed plate 12 by the second hinge pin 111.

Furthermore, a lower end portion of the rear link 120 may be hingedly fastened to the front end portion of the support link 110 by a third hinge pin 121, a middle portion of the rear link may be hingedly fastened to the middle portion of the main link 50 by a fourth hinge pin 122, and an upper end portion of the rear link may be hingedly fastened to the rear end portion of the leg rest link 82 by a fifth hinge pin 123.

Furthermore, a lower end portion of the front link 130 may be hingedly fastened to a front end portion of the main link 50 by a sixth hinge pin 131, and an upper end portion of the front link may be hingedly fastened to a middle portion of the leg rest link 82 by a seventh hinge pin 132.

Hereinafter, the operation of the leg rest according to various exemplary embodiments of the present invention configured as described above will be described.

Figure 4:
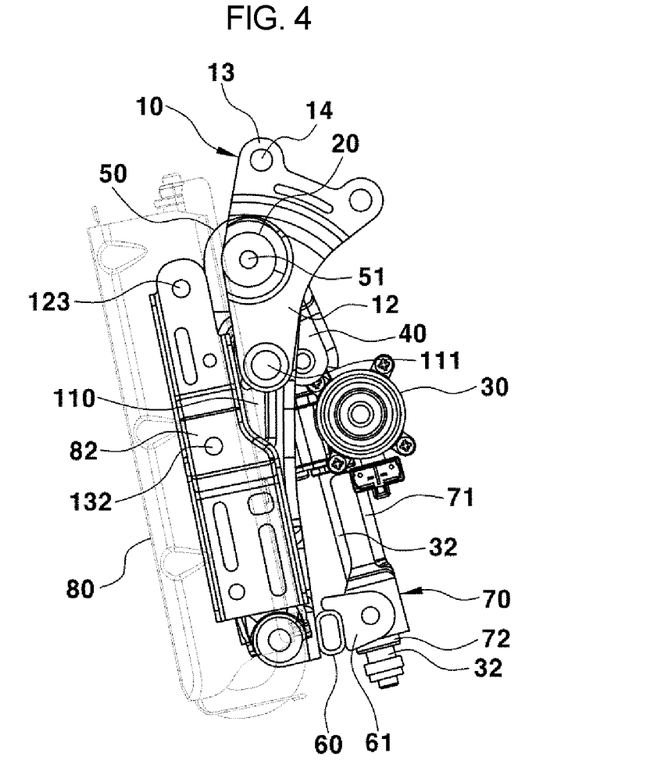
FIG. 4 is a side view exemplarily illustrating a folding state of a power leg rest for a vehicle according to various exemplary embodiments of the present invention.

Accompanying FIGS. 2 and 4 represent a folded state of the power leg rest for a vehicle according to various exemplary embodiments of the present invention.

As shown in FIGS. 2 and 4, in the folded state (non-use state) of the leg rest, the tilt motor 30 may be rotated to the rearmost position and arranged immediately below the motor mounting bracket 40, and additionally, the lead screw 32, which is the output shaft of the tilt motor 30, may be arranged in an upward and downward direction and inclined rearward thereof.

Furthermore, in the folding state (non-use state) of the leg rest, the lead nut bracket 70 may be moved and located at a most retracted position adjacent to a rear end portion of the lead screw 32 by rotating the lead screw 32 in place in one direction using the rotation drive of the tilt motor 30.

Furthermore, when the lead nut bracket 70 moves backward, the support pipe 60 is pulled and may be arranged at a lower side, and at the same time, the main links 50 welded with the support pipe 60 may be rotated to the rearmost position thereof and arranged in an up and down direction thereof.

Simultaneously, when the main links 50 are rotated rearward thereof, the support link 110, the rear link 120, and the front link 130 may be folded and arranged in the up and down direction, and the leg rest link 82 hingedly fastened to the rear link 120 and the front link 130 may be also folded, whereby the leg rest frame 80 may be placed in the folding position (non-use position).

Figure 5:
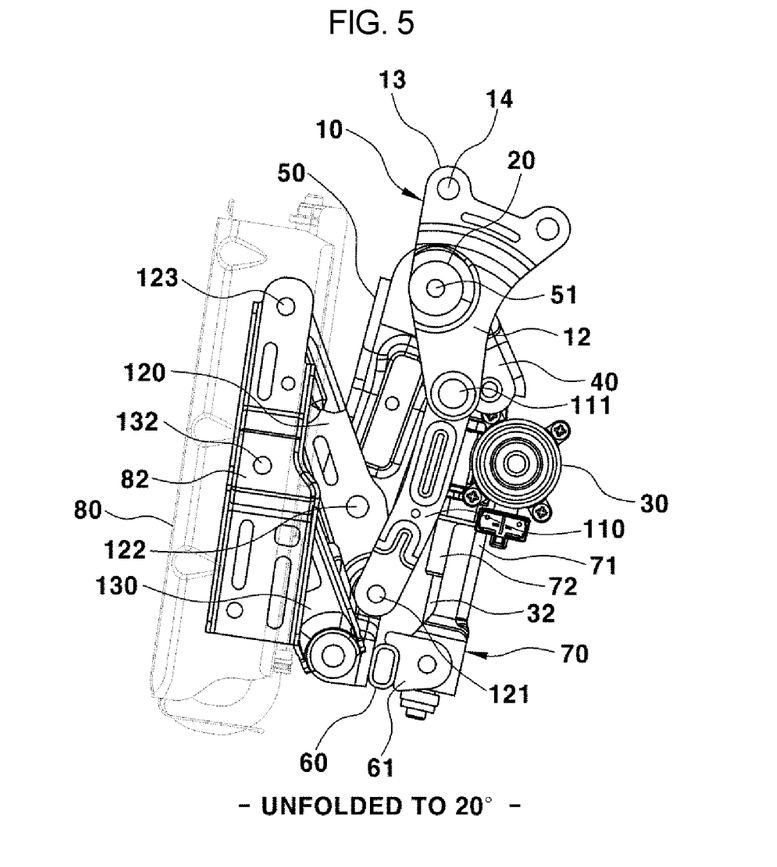
FIG. 5, FIG. 6 and FIG. 7 are side views illustrating the sequential operations for unfolding a power leg rest for a vehicle according to various exemplary embodiments of the present invention.
Figure 6:
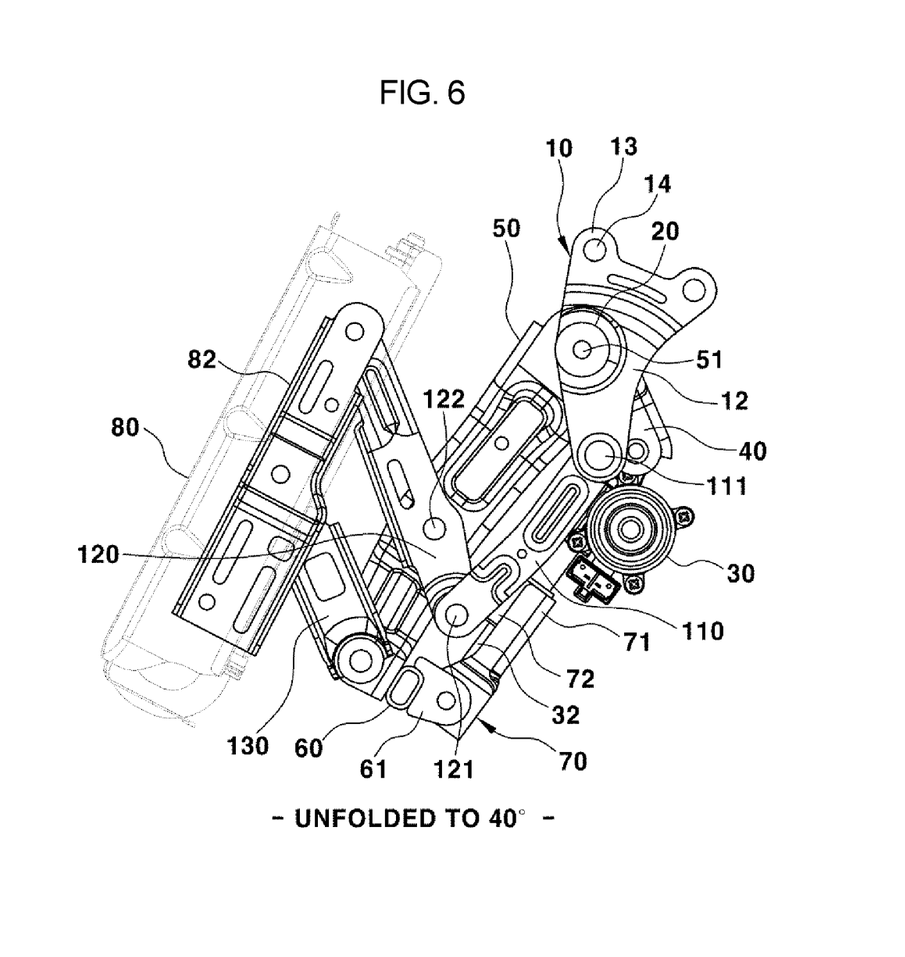
Figure 7:
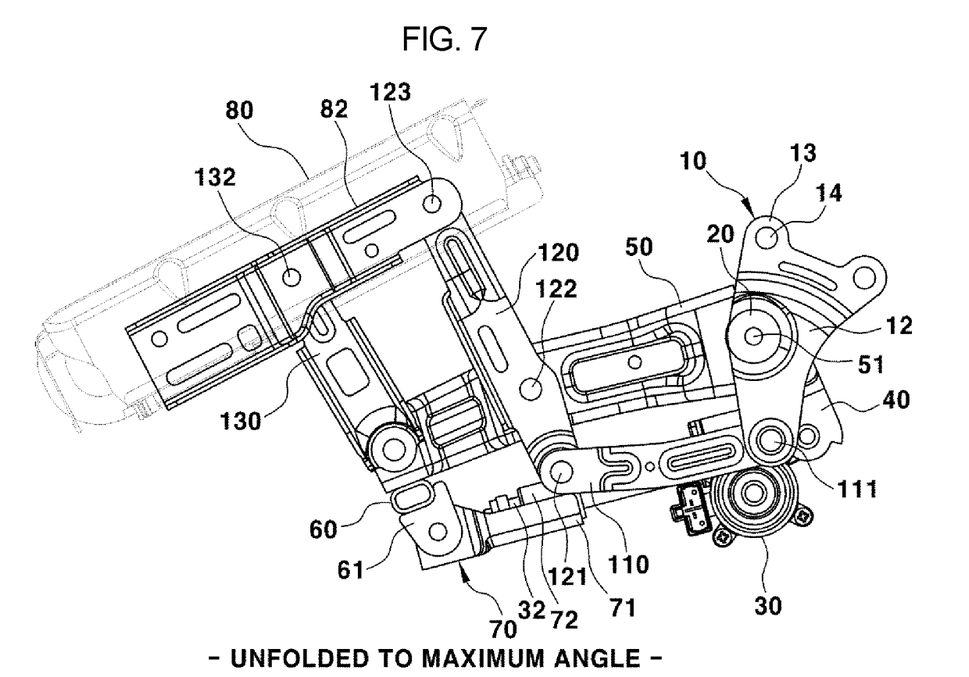

Accompanying FIG. 3 is a perspective view exemplarily illustrating an unfolded state of a power leg rest for a vehicle according to various exemplary embodiments of the present invention, and FIG. 5, FIG. 6 and FIG. 7 are side views illustrating the sequential operations for unfolding the power leg rest for a vehicle according to various exemplary embodiments of the present invention.

To unfold the leg rest to a use position, the lead screw 32 may be rotated in place in the other direction according to the rotation drive of the tilt motor 30 in the other direction thereof, and thus the lead nut bracket 70 may be moved forward toward the front end portion of the lead screw 32.

Due to the forward movement of the lead nut bracket 70, the support pipe 60 is pushed upwards forward, and thus is rotated toward the unfolding position of the leg rest. At the instant time, as the lead nut bracket 70 is moved forward, the tilt motor 30 is rotated forward around the point where the tilt motor is hingedly fastened to the motor mounting bracket 40.

Furthermore, when the support pipe 60 is rotated to the unfolded position, the main links 50 welded with the support pipe 60 are rotated to the unfolding position around the first hinge pins 51 by which the main links are respectively fastened to the first fixed plates 11.

Additionally, when each of the main links 50 is rotated toward the unfolding position of the leg rest, as shown in FIG. 6 and FIG. 7, the rear link 120 and the front link 130 of each driving link are rotated so that they may be erected pushing up the leg rest link 82 forward thereof. At the instant time, the support link 110 of each driving link is also rotated forward, supporting the lower end portion of the rear link 120.

Accordingly, as the leg rest links 82 are pushed up forward, the leg frame 80 integrally connected to the leg rest links 82 is moved toward the unfolding position (use position) thereof.

Meanwhile, as each leg rest link 82 is pushed up forward, an angle between the main link 50 and the front link 130 and an angle between the main link 50 and the rear link 120 are increased, so that the unfolding operation of the leg rest frame 80 may be performed to a desired angle.

For example, by the unfolding operation as described above, the leg rest frame 80 may be rotated from the folding position to an angle of 20° as shown in FIG. 5, or from the folding position to an angle of 40° as shown in FIG. 6, or from the folding position to a maximum angle of 77° as shown in FIG. 7.

As described above, by employing the tilt motor 30 and the lead nut bracket 70 mounted movably forwards and backwards on the lead screw 32, which is the output shaft of the tilt motor 30, the folding and unfolding operations of the leg rest may be performed stably, and furthermore, when compared to the conventional leg rest including the motor and complex recliner for reclining, decrease in the number of components employed in the leg rest and reduction of the weight of the leg rest may be achieved, which in turn can improve durability of the leg rest.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A leg rest apparatus comprising:
a pair of fixed plates configured to be connected to a seat cushion frame;
a main pipe connected between internal surfaces of the pair of fixed plates;
a tilt motor tiltably mounted to the main pipe;
a pair of main links, rear end portions of which are each hingedly fastened to an external surface of a corresponding one of the pair of fixed plates by a first hinge pin;
a support pipe connected between front end portions of the pair of main links;
a lead nut bracket coupled to a lead screw and movable forwards and backwards, wherein the lead screw is an output shaft of the tilt motor, and hingedly fastened to the support pipe;
a pair of leg rest links mounted on a first side and a second side of a leg rest frame; and
a pair of driving links, each being hingedly fastened to a corresponding one of the pair of leg rest links, a corresponding one of the pair of main links, and the corresponding one of the pair of fixed plates, operating in linkage with the pair of main links, and folding or unfolding the pair of leg rest links,
wherein each of the driving links includes:
a front link hingedly fastened to each of the leg rest links and the main links; and
a rear link having a first end hingedly coupled to the leg rest links at a predetermined distance apart from the front link and a second end hingedly coupled to a support link hingedly coupled to the fixed plates, wherein the rear link is hingedly coupled to the main links between the first end and the second end.

2. The leg rest apparatus of claim 1,
the support link is hingedly fastened to a lower end portion of the fixed plates by a second hinge pin;
a rear link is hingedly fastened to a front end portion of the support link by a third hinge pin at a lower end portion of the rear link, hingedly fastened to a middle portion of one of the main links by a fourth hinge pin at a middle portion of the rear link, and hingedly fastened to a rear end portion of one of the leg rest links by a fifth hinge pin at an upper end portion of the rear link, and
the front link is hingedly fastened to a front end portion of the one of the main links by a sixth hinge pin at a lower end portion of the front link, and hingedly fastened to a middle portion of one of the leg rest links by a seventh hinge pin at an upper end portion of the front link.

3. The leg rest apparatus of claim 2, wherein when the lead screw is rotated by a drive of the tilt motor, the lead nut bracket is moved forward and pushes up the support pipe forward, whereby each of the main links secured to the support pipe is rotated to an unfolded position of the leg rest apparatus and the rear link and the front link of each of the driving links are erected pushing up the pair of leg rest links forward.

4. The leg rest apparatus of claim 3, wherein as the pair of leg rest links is pushed up forward, an angle between corresponding one of the main link and the front link and an angle between the corresponding one of the main link and the rear link are increased, so that unfolding operation of the leg rest frame is performed to a target angle.

5. The leg rest apparatus of claim 2, wherein each of the pair of fixed plates includes:
a first fixed plate having an internal surface to which one end portion of the main pipe is fixed, and an external surface to which the rear end portion of the one of the main links is hingedly fastened by the first hinge pin; and
a second fixed plate being in contact with and attached to the external surface of the first fixed plate, and hingedly fastened to a rear end portion of the support link by the second hinge pin at a lower end portion of the second fixed plate.

6. The leg rest apparatus of claim 5,
wherein each of the first and second fixed plates is provided with a mounting end portion formed at an upper end portion of each of the first and second fixed plates, and
wherein the mounting end portion has a mounting hole configured for being coupled to the seat cushion frame.

7. The leg rest apparatus of claim 1, wherein a motor mounting bracket to which the tilt motor is tiltably fastened is fixedly mounted to the main pipe.

8. The leg rest apparatus of claim 7, wherein the motor mounting bracket is provided with a first hinge hole formed in a lower portion of the motor mounting bracket, and the tilt motor has a first hinge end portion hingedly fastened to the first hinge hole by a first tilting pin.

9. The leg rest apparatus of claim 1, wherein the lead nut bracket includes a lead nut portion engaged to the lead screw and movable forwards and backwards of the lead screw according to a rotation of the lead screw, and a bracket portion hingedly fastened to the support pipe, wherein the lead nut portion and the bracket portion are integrally formed into a single piece.

10. The leg rest apparatus of claim 9, wherein the bracket portion is provided with a second hinge hole formed at a front end portion of the bracket portion, and the support pipe is provided with a second hinge end portion hingedly fastened to the second hinge hole by a second tilting pin.

11. A leg rest apparatus comprising:
a pair of fixed plates configured to be connected to a seat cushion frame;
a main pipe connected between internal surfaces of the pair of fixed plates;
a tilt motor tiltably mounted to the main pipe;
a pair of main links, rear end portions of which are each hingedly fastened to an external surface of a corresponding one of the pair of fixed plates by a first hinge pin;
a support pipe connected between front end portions of the pair of main links;
a lead nut bracket coupled to a lead screw and movable forwards and backwards, wherein the lead screw is an output shaft of the tilt motor, and hingedly fastened to the support pipe;
a pair of leg rest links mounted on a first side and a second side of a leg rest frame; and
a pair of driving links, each being hingedly fastened to a corresponding one of the pair of leg rest links, a corresponding one of the pair of main links, and the corresponding one of the pair of fixed plates, operating in linkage with the pair of main links, and folding or unfolding the pair of leg rest links, wherein each of the driving links includes:
a support link hingedly fastened to a lower end portion of the fixed plates by a second hinge pin;

a rear link hingedly fastened to a front end portion of the support link by a third hinge pin at a lower end portion of the rear link, hingedly fastened to a middle portion of one of the main links by a fourth hinge pin at a middle portion of the rear link, and hingedly fastened to a rear end portion of one of the leg rest links by a fifth hinge pin at an upper end portion of the rear link; and a front link hingedly fastened to a front end portion of the one of the main links by a sixth hinge pin at a lower end portion of the front link, and hingedly fastened to a middle portion of one of the leg rest links by a seventh hinge pin at an upper end portion of the front link.

12. The leg rest apparatus of claim 11, wherein each of the pair of fixed plates includes:

a first fixed plate having an internal surface to which one end portion of the main pipe is fixed, and an external surface to which the rear end portion of the one of the main links is hingedly fastened by the first hinge pin; and a second fixed plate being in contact with and attached to the external surface of the first fixed plate, and hingedly fastened to a rear end portion of the support link by the second hinge pin at a lower end portion of the second fixed plate.

13. The leg rest apparatus of claim 12, wherein each of the first and second fixed plates is provided with a mounting end portion formed at an upper end portion of each of the first and second fixed plates, and wherein the mounting end portion has a mounting hole configured for being coupled to the seat cushion frame.

14. The leg rest apparatus of claim 11, wherein a motor mounting bracket to which the tilt motor is tiltably fastened is fixedly mounted to the main pipe.

15. The leg rest apparatus of claim 14, wherein the motor mounting bracket is provided with a first hinge hole formed in a lower portion of the motor mounting bracket, and the tilt motor has a first hinge end portion hingedly fastened to the first hinge hole by a first tilting pin.

16. The leg rest apparatus of claim 11, wherein the lead nut bracket includes a lead nut portion engaged to the lead screw and movable forwards and backwards of the lead screw according to a rotation of the lead screw, and a bracket portion hingedly fastened to the support pipe, wherein the lead nut portion and the bracket portion are integrally formed into a single piece.

17. The leg rest apparatus of claim 16, wherein the bracket portion is provided with a second hinge hole formed at a front end portion of the bracket portion, and the support pipe is provided with a second hinge end portion hingedly fastened to the second hinge hole by a second tilting pin.

18. The leg rest apparatus of claim 11, wherein when the lead screw is rotated by a drive of the tilt motor, the lead nut bracket is moved forward and pushes up the support pipe forward, whereby each of the main links secured to the support pipe is rotated to an unfolded position of the leg rest apparatus and the rear link and the front link of each of the driving links are erected pushing up the pair of leg rest links forward.

19. The leg rest apparatus of claim 18, wherein as the pair of leg rest links is pushed up forward, an angle between corresponding one of the main link and the front link and an angle between the corresponding one of the main link and the rear link are increased, so that unfolding operation of the leg rest frame is performed to a target angle.

* * * * *